Dec. 6, 1932.   P. G. EDWARDS   1,889,824
TESTING SYSTEM
Filed Dec. 30, 1931
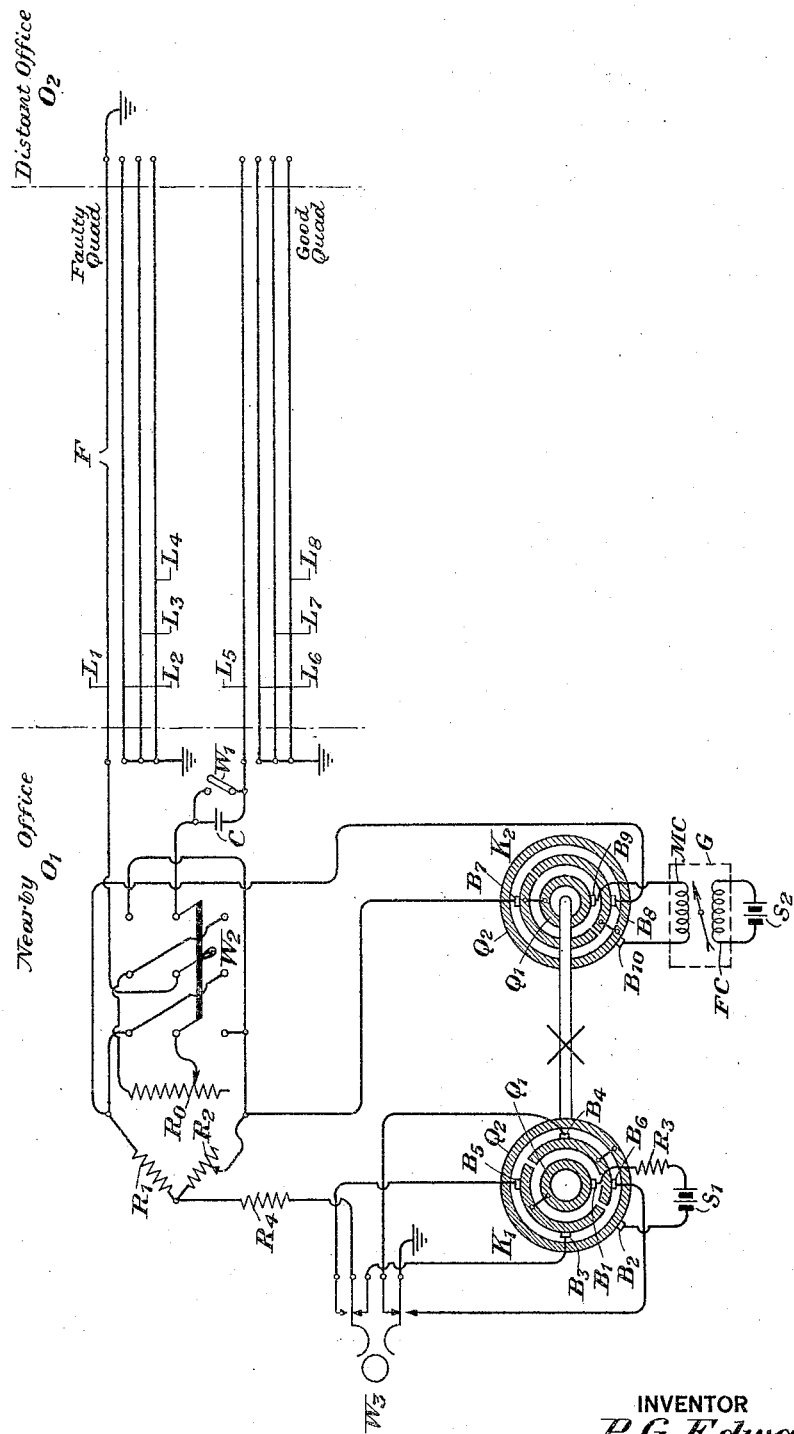
INVENTOR
*P. G. Edwards*
BY
ATTORNEY Patented Dec. 6, 1932

1,889,824

UNITED STATES PATENT OFFICE

PAUL G. EDWARDS, OF MILLBURN, NEW JERSEY, ASSIGNOR TO AMERICAN TELEPHONE AND TELEGRAPH COMPANY, A CORPORATION OF NEW YORK

TESTING SYSTEM

Application filed December 30, 1931. Serial No. 583,989.

This invention relates generally to electrical testing systems. More particularly, this invention relates to arrangements for locating an open circuit in one of the conductors of a telephone or other cable. Still more particularly, this invention relates to arrangements for eliminating such inductive interference as may affect and introduce error into the proper determination of the location of the fault in one of the conductors of the cable.

Heretofore, it has been possible to locate a fault in one of the conductors of a telephone line in a cable, by connecting that line as one of the arms of a Wheatstone bridge arrangement, a diagonal of which was supplied with pulsating current of reversible polarity, the other diagonal of which was connected to a galvanometer. However, currents induced into the Wheatstone bridge arrangement from extraneous sources such as grounded telephone circuits and other circuits or systems transmitting currents, interfered with the accurate location of the fault because these extraneous sources caused the pointer of the galvanometer to fluctuate over a very wide range.

Therefore, one of the objects of this invention is to provide arrangements for determining accurately the location of a fault in the conductor of a cable while at the same time eliminating the effect of extraneously induced currents.

Another of the objects of this invention consists in the provision of apparatus for the continuous application of alternating current of low frequency to one diagonal of a Wheatstone bridge arrangement, one of the arms of which includes a faulty conductor, including apparatus for deriving from the other diagonal of the bridge a steady direct current whereby the location of the fault may be accurately determined without interference from currents of induction.

While this invention will be pointed out with particularity in the appended claims, the invention itself both as to its further objects and features may be better understood from the detailed description hereinafter following when read in connection with the accompanying drawing, showing one embodiment of the invention merely for the purpose of illustration.

Referring to the drawing, the reference character $L_1$ designates a conductor extending between a nearby office $O_1$ and a distant office $O_2$. This conductor may have a fault designated F, some distance from the nearby office $O_1$. This fault may be caused, for example, by a poorly soldered connection, by the careless joining of one part of the conductor with the other, or by any other form of disconnection. A bridge arrangement to be subsequently described, will be employed to determine the location of the resistive fault F, as well as to compare the capacitance of that conductor with the capacitance of a good conductor.

The reference characters $L_2$, $L_3$ and $L_4$ represent three other conductors in the same quad as conductor $L_1$, and these conductors also extend between the offices $O_1$ and $O_2$. The conductor $L_2$ may be the mate of the conductor $L_1$, and the conductors $L_3$ and $L_4$ may be considered as the other pair of the quad. The conductors $L_2$, $L_3$ and $L_4$ are connected together at the nearby measuring office $O_1$, and they are jointly grounded. At the distant office $O_2$ the conductor $L_1$ is grounded.

The conductors $L_5$, $L_6$, $L_7$ and $L_8$ represent the four conductors forming another quad of the same cable, all of which are in good condition. The conductors $L_6$, $L_7$ and $L_8$ are connected together at the nearby office $O_1$ and these are all grounded. The conductor $L_5$ is arranged in one of the arms of the bridge arrangement which is adjacent to the arm including the faulty conductor $L_1$. The various conductors of the two quads are set up so that the capacitance conditions will be as uniform as possible.

The conductor $L_5$ is in series with a single pole switch $W_1$ and the switch $W_1$ is shunted by a condenser C. A variable resistance $R_0$ is connected to a triple pole, double throw switch $W_2$ which has reversing features designed to permit the resistance $R_0$ to be connected either to the upper arm of the bridge which includes the faulty conductor $L_1$, or to the lower arm of the bridge which includes the good conductor $L_5$. The fixed resistance $R_1$ and the variable resistance $R_2$ form the two ratio arms of the bridge arrangement.

The source of excitation of the bridge arrangement is connected to one of its diagonals through a commutator $K_1$ and a phase shift key $W_3$. The commutator $K_1$ is associated with motor driven apparatus (motor not shown). The current derived from the other diagonal of the bridge arrangement is transmitted to a galvanometer $G$ through another commutator $K_2$. The commutators $K_1$ and $K_2$ are mechanically coupled to one another in any well known manner, and they are revolved at the same speed, preferably a low speed such, for example, as four revolutions per second.

Each commutator has two segments designated $P_1$ and $P_2$, and two slip rings designated $Q_1$ and $Q_2$, the segment $P_1$ being connected to the slip ring $Q_1$, and the segment $P_2$ being connected to the slip ring $Q_2$. Brushes $B_1$ and $B_2$ are associated with the slip rings $Q_1$ and $Q_2$ of the commutator $K_1$, respectively. The brushes $B_3$ and $B_4$ are associated alternately with the segments $P_1$ and $P_2$ of the commutator $K_1$. Similarly, the brushes $B_5$ and $B_6$ are associated alternately with the segments $P_1$ and $P_2$.

The brushes $B_1$ and $B_2$ may be considered as the input brushes of commutator $K_1$, and these are connected in a series circuit formed by a battery $S_1$ and a resistance $R_3$. The brushes $B_3$ and $B_4$, and the brushes $B_5$ and $B_6$ may be considered as different pairs of output brushes which are displaced 90 degrees from each other. The phase shift key $W_3$ normally connects the brushes $B_3$ and $B_4$ to one of the diagonals of the bridge arrangement, and when this key is operated the brushes $B_3$ and $B_4$ become disconnected and are replaced by the brushes $B_5$ and $B_6$.

The brushes $B_7$ and $B_8$ are the input brushes of the commutator $K_2$. These brushes receive current from another diagonal of the bridge arrangement and this current is impressed alternately upon the segments $P_1$ and $P_2$ of commutator $K_2$. The brushes $B_9$ and $B_{10}$ are associated with the slip rings $Q_1$ and $Q_2$ of commutator $K_2$, respectively, and these brushes form the output pair. The latter pair of brushes impress unidirectional current upon the moving coil $MC$ of the galvanometer $G$. The fixed coil $FC$ of this galvanometer is connected to a battery $S_2$.

The battery designated $S_1$, by virtue of its connection to the input brushes $B_1$ and $B_2$ of commutator $K_1$, provides an alternating potential for one of the diagonals of the bridge arrangement. The alternating potential is transmitted through the phase shift key $W_3$ and the protective resistance $R_4$. The frequency of the potential applied to this diagonal of the bridge arrangement will be equal to the number of revolutions per second made by the commutating apparatus. Thus, if the commutating apparatus makes four revolutions per second, the potential applied to the diagonal of the bridge arrangement will be reversed four times each second.

The moving coil $MC$ and the fixed coil $FC$ of the galvanometer $G$, are mutually reactive. By virtue of the connection of the fixed coil $FC$ to the battery $S_2$ a steady magnetic field is provided for the galvanometer. However, a permanently magnetized element may, if desired, be substituted for the fixed coil $FC$ and the battery $S_2$.

To determine the location of the fault $F$ in the conductor $L_1$, switch $W_2$ is moved to its lower position so as to place the rheostat $R_0$ in series with the conductor $L_5$. At the same time switch $W_1$ is opened. The phase shift key $W_3$ is retained in its normal position. The resistance of the rheostat $R_0$ is reduced to zero. The rheostat $R_2$ is adjusted so as to bring the pointer of the galvanometer $G$ quite close to its central position. Then the phase shift key $W_3$ is operated so as to change the phase of the potential applied to the bridge by 90°. The rheostat $R_0$ may now be adjusted until the pointer of the galvanometer $G$ is again close to its central position.

The rheostats $R_0$ and $R_2$ should be balanced several times with the phase shift key $W_3$ in its corresponding positions abovementioned. The pointer of the galvanometer $G$ will finally remain quite fixed at its mid position even while the phase shift key $W_3$ is operated and released several times. The magnitude of the resistance $R_2$ is then recorded.

Another of the conductors within the same quad as the conductor $L_1$ as, for example, the conductor $L_2$, will then be substituted for the conductor $L_1$, and the various steps outlined hereinabove will be repeated so as to obtain a different value of resistance at the rheostat $R_2$ for a balanced condition in the bridge arrangement. The ratio of the first value of the resistance of rheostat $R_2$ obtained when the conductor $L_1$ was connected to the bridge arrangement, to the second value of the resistance of the rheostat $R_2$ obtained when a conductor such as $L_2$ was connected to the bridge arrangement, will represent the percentage distance from the nearby office $O_1$ to the fault $F$.

If the fault $F$ is too close to the nearby office $O_1$, then it will be impossible to bring the pointer of the galvanometer $G$ near its mid position by the adjustment of the resistance of rheostat $R_0$. In that event the switch $W_2$ will be moved to its upper position so as to place the rheostat $R_0$ in the upper arm of the bridge arrangement. The proper adjustment of the rheostat $R_0$ will then permit the operator to readily bring the pointer of the galvanometer $G$ to its mid position, unless the fault F is at or extremely close to the nearby office $O_1$.

Some of the principles underlying this invention whereby the effect of currents induced from extraneous sources is prevented from affecting the measurements for the determination of a fault in a conductor, will now be explained.

The capacitance of a cable conductor such as $L_1$ is proportional to its length and this capacitance will be greater as the conductor is longer. In this invention the capacitance to ground of the conductor $L_1$ is first obtained, and then another conductor such as $L_2$ is substituted for the conductor $L_1$, and the capacitance to ground of the conductor $L_2$ is measured. The ratio of these capacitances will represent the percentage distance to the fault, provided there are no currents induced into the measuring apparatus from extraneous sources.

But, in considering the effect of induced interfering currents it will be necessary to further analyze the apparatus involved in this invention. A conductor such as $L_1$ or $L_5$, for example, may be assumed as the equivalent of a resistance component in series with a capacitance component. Each conductor may be considered as a generator of an interfering potential. Each of the generators simulating conductors $L_1$ and $L_5$ may be considered as having a low reactance and a resistance proportional to its length. These resistances are merely the resistive components of the impedances of the conductors. The condenser C which is in series with the conductor $L_5$ in the arrangement shown in the drawing, may be neglected because of its comparatively low reactance at the frequencies involved in the tests. It is a fact, determined by experiment, that the same electromotive forces are generated in a short conductor as in a long conductor. The only apparent difference between the effect of a short conductor and that of a long one, so far as interfering potentials are concerned, lies merely in its resistive component. In other words, the action of the apparatus of this invention is the same as if a single electromotive force supplied current through the resistive components of the good and bad conductors $L_1$ and $L_5$, respectively, to the bridge arrangement, this electromotive force being, of course, in the diagonal of the bridge arrangement which supplies energy thereto. Since the bridge arrangement may be balanced for the alternating potential applied thereto by the commutating apparatus $K_1$, it may also be balanced for the interfering potential.

It will be apparent that the condenser C is grounded through the capacitance of the good conductor $L_5$ rather than directly. The effect of this series arrangement is to reduce the capacitance somewhat below that of the condenser C and to add the resistive component of the conductor $L_5$. Thus, if the condenser C be assumed to be a one microfarad capacity, then a 50 mile No. 19 gauge non-loaded line would reduce the capacitance from one microfarad to about 0.85 microfarads, and the added resistance would be about 700 ohms.

There is a decided advantage in having the conductor $L_5$ in series with the condenser C. In this arrangement the flutter of the pointer of the galvanometer which is caused by extraneously induced currents, is considerably reduced because the two quads of conductors connected to the bridge arrangement are in the same cable and preferably in the same group of quads. Induced voltages have substantially the same effect on all of the conductors of the two quads, and the bridge arrangement may be much more easily balanced under these conditions than it would be if the condenser C were directly grounded.

The switch $W_1$ is shown in shunt with condenser C. The condenser C may be short-circuited by this switch if it is desired to compare the capacitances of the conductors $L_1$ and $L_5$ directly.

While this invention has been shown and described in certain arrangements merely for the purpose of illustration, it will be understood that this invention may be applied to other and widely varied organizations without departing from the spirit of the invention and the scope of the appended claims.

What is claimed is:

1. Apparatus for determining the location of a fault in a conductor and avoiding the effect of interfering potentials on the apparatus, comprising a Wheatstone bridge arrangement including the faulty conductor as one of its arms, a good conductor connected as another of its arms, a rheostat, means for connecting said rheostat in series with either of said arms, a source of alternating potential connected to one of the diagonals of the Wheatstone bridge arrangement, means for changing the phase of said alternating potential by 90 degrees, and means responsive to the alternating potential derived from the other diagonal of the bridge arrangement to determine whether the bridge arrangement is balanced.

2. Apparatus for determining the location of a fault in a conductor including a Wheatstone bridge arrangement, the faulty conductor being connected as one of the arms of the Wheatstone bridge arrangement, a good conductor, a condenser connected in series with the good conductor as another of the arms of said Wheatstone bridge arrangement, a rheostat, and means for connecting said rheostat in series with either of said arms of the Wheatstone bridge arrangement.

3. Apparatus for determining the location of a fault in one of the conductors of a cable comprising a Wheatstone bridge arrangement, the faulty conductor being grounded at its distant end and being connected as one of the arms of the Wheatstone bridge arrangement, a good conductor connected as another of the arms of said Wheatstone bridge arrangement, a rheostat, means for connecting said rheostat in series with either of said arms of the Wheatstone bridge arrangement, means for applying an alternating potential to one of the diagonals of the Wheatstone bridge arrangement, means for changing the phase of said alternating potential by 90 degrees, means for converting any alternating potential received from the other diagonal of the Wheatstone bridge arrangement into a steady direct current, and a galvanometer upon which the steady direct current is impressed.

4. Apparatus for locating a fault in a cable conductor while preventing the effect of induced potentials from interfering with the apparatus comprising a good conductor of the same cable, a condenser connected in series with the good conductor, the faulty conductor being grounded at the distant end, and a Wheatstone bridge arrangement for comparing the capacitance to ground of the faulty conductor with that of the good conductor and condenser.

5. Apparatus for determining the location of a fault in a cable conductor while maintaining the apparatus substantially free from interference caused by induced currents, comprising a good conductor located in the same cable, a condenser connected in series with the good conductor, a Wheatstone bridge arrangement for comparing the capacitance to ground of the faulty conductor with that of the condenser and good conductor, a rheostat, and means for connecting said rheostat in series with either of said conductors.

In testimony whereof, I have signed my name to this specification this 29th day of December, 1931.

PAUL G. EDWARDS.